Jan. 24, 1967  R. N. THIETJE  3,299,838
ELECTRIC ICE CREAM DIPPER
Filed Dec. 21, 1964  2 Sheets-Sheet 1

Rudolph N. Thietje
INVENTOR

BY *Warren A. O'Brien*
and *Harvey B. Jackson*
Attorneys

Jan. 24, 1967  R. N. THIETJE  3,299,838
ELECTRIC ICE CREAM DIPPER
Filed Dec. 21, 1964  2 Sheets-Sheet 2
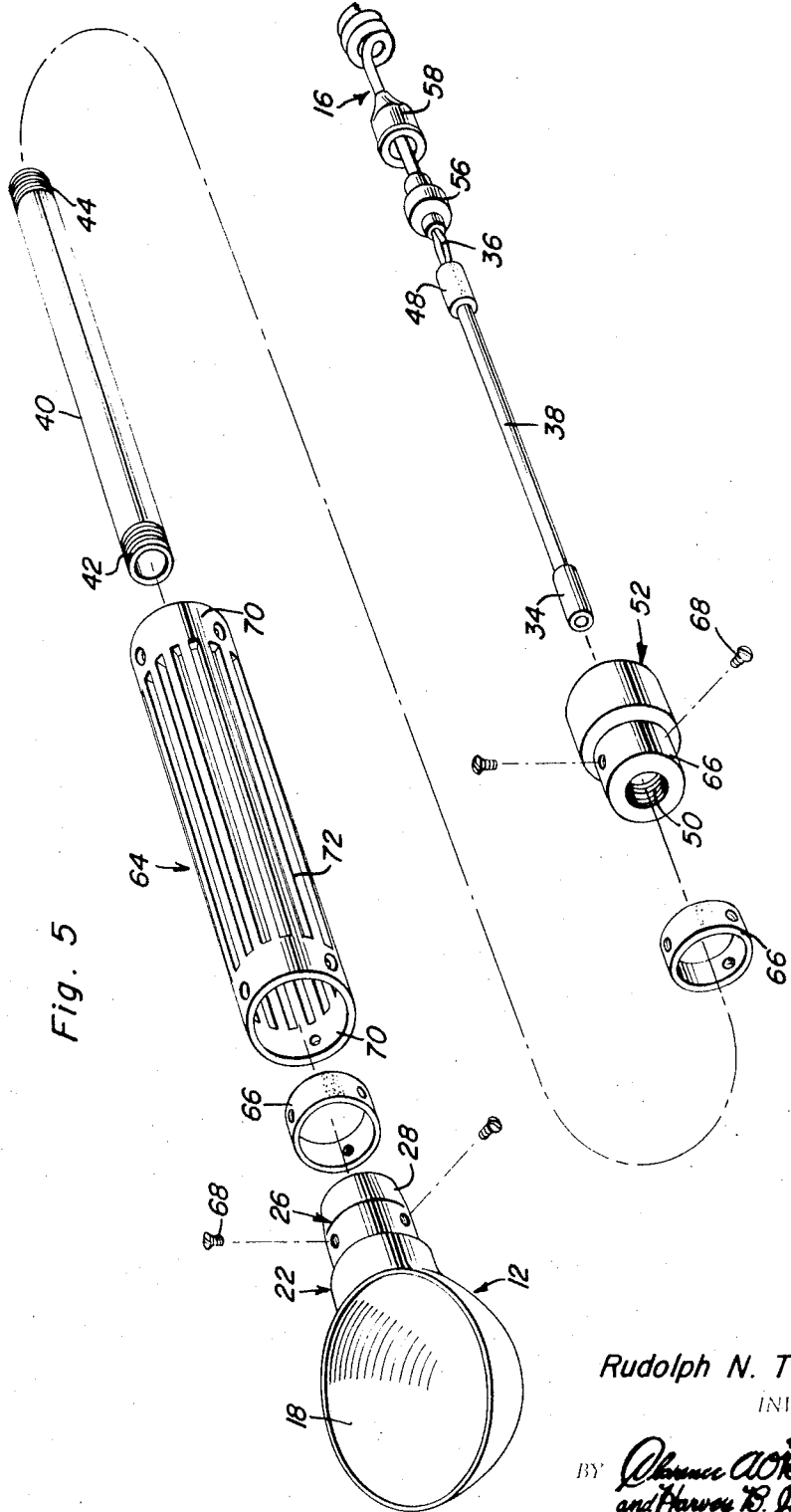
Rudolph N. Thietje
INVENTOR
BY *Clarence A. O'Brien*
and *Harvey B. Jacobson*
Attorneys

United States Patent Office 3,299,838
Patented Jan. 24, 1967

3,299,838
ELECTRIC ICE CREAM DIPPER
Rudolph N. Thietje, Rte. 1, Box 170A,
Kennewick, Wash. 99336
Filed Dec. 21, 1964, Ser. No. 419,837
7 Claims. (Cl. 107—48)

The present invention is generally concerned with scoops or dippers and more particularly relates to an ice cream dipper electrically heated so as to facilitate the scooping and serving of ice cream.

It is a primary object of the present invention to provide an ice cream dipper incorporating a heating element which enables the bowl or scoop portion thereof to easily enter into the normally quite hard ice cream as it is provided in large containers, and withdraw a predetermined portion thereof.

In conjunction with the above object, it is also a significant object of the invention to provide an ice cream dipper wherein the heated nature of the bowl eliminates any tendency for the ice cream to adhere thereto, such as, in the absence of such heat, give rise to difficulty in removing the ice cream from the bowl.

Further, an important object of the instant invention resides in the compact construction of the dipper along with the unique insulated handle which eliminates any transfer of heat to the hand of the user.

In addition, an object of the instant invention is to provide for the control of the heat through a thermostat incorporated directly into the handle.

Also, it is an object of the instant invention to provide an ice cream dipper which is relatively simple in construction, highly durable, and capable of continuous efficient operation over extended periods of time.

Basically, in achieving the above objects, it is contemplated that the ice cream dipper of the instant invention include an enlarged cast aluminum semispherical scoop or bowl with an elongated handle portion projecting laterally from one side thereof. This handle portion is to incorporate, within an open ribbed gripping sleeve, a longitudinally extending heating element spaced and insulated from the surrounding gripping sleeve and engaged with the bowl at one end thereof and with an elongated flexible power cord at the other end thereof. In addition, within an insulating cap on the end of the handle portion, the power cord is to be provided with a temperature controlling thermostat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is an exploded perspective view of the various elements which go in to making up the ice cream dipper of the instant invention.

Figure 1:
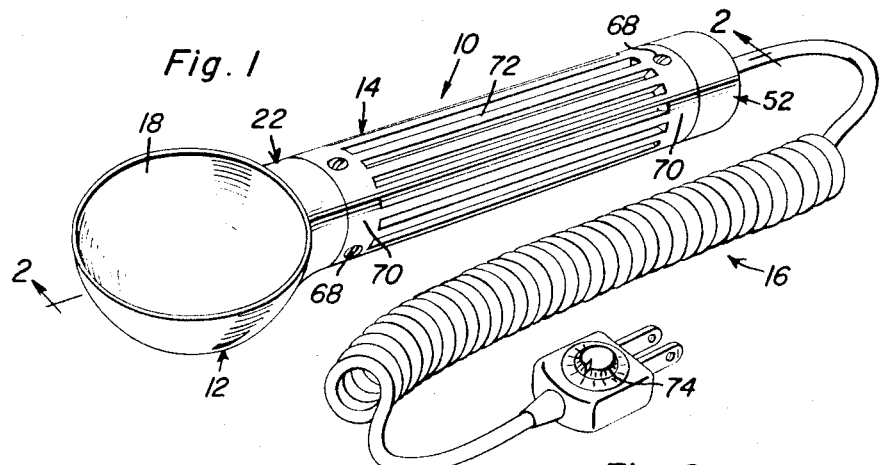
FIGURE 1 is a perspective view of the electric ice cream dipper comprising the present invention.

Referring now more specifically to the drawings, reference numeral 10 is used to generally designate the ice cream dipper of the instant invention, this dipper including a bowl portion 12, a handle portion 14 and an elongated flexible power cord 16.

The bowl portion 12, preferably formed of cast aluminum, includes a laterally directed enlarged semispherical bowl 18 having a relatively narrow annular rim 20. In addition to the bowl 18, the portion 12 includes an elongated neck 22 having an annular shoulder 24 formed thereabout by a diametrically reduced extending cylindrical portion 26, the outermost portion 28 thereof being generally conically shaped. The neck portion 22 includes, extending inwardly from the conical end 28 thereof, an elongated blind bore 30 having an enlarged internally threaded countersunk portion 32.

Figure 2:
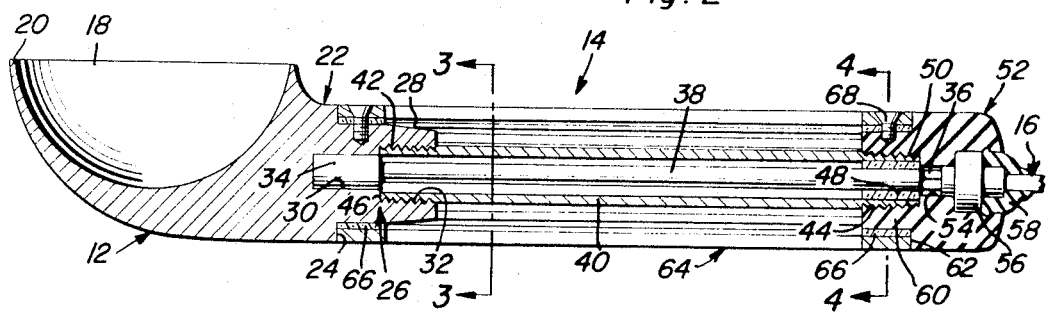
FIGURE 2 is an enlarged longitudinal cross-sectional view taken substantially upon the plane passing along line 2—2 of FIGURE 1.

The actual heating or resistance element 34 is located within the blind bore 30 inward of the countersunk portion 32 and is engaged, in the conventional manner, with the power cord wires 36 enclosed within a protective tubular housing 38 which extends longitudinally from the heating element 34 through the handle portion 10. Enclosing the tubular housing 38 is an elongated hollow pipe section 40 having externally threaded opposite ends 42 and 44. As will be appreciated from FIGURE 2, the internal diameter of the pipe section 40 is substantially larger than the external diameter of the tubular housing 38. The first end 42 of the pipe section 40 is threaded within the countersunk portion 32 and abuts against the shoulder 46 defined by the countersunk portion. The opposite end 44 of the pipe section 40, which incidentally corresponds to the other end of the tubular housing 38 spaced coaxially therein by an insulated cylindrical spacer, is threaded within an internally threaded enlarged countersunk portion in the cap 52 which is formed of any suitable non-conductive material such as Bakelite. This cap 52 includes an elongated passage 54 completely therethrough and communicating with the countersunk portion 50, this passage 54 allowing communication of the power cord 16 with the heating element 34, and also including an enlarged chamber which receives a conventional thermostat 56 and neoprene sealing plug 58 so as to insure a water-tight seal. The cap 52, which incidentally has approximately the same cross-sectional area as the neck portion 22 of the bowl portion 12, also includes a projecting portion 60 which is diametrically reduced so as to provide an annular bearing shoulder 62.

The actual gripping portion of the handle portion 10 is provided by an elongated gripping sleeve 64 having the opposite open ends thereof received over the reduced portions 26 and 60 in conjunction with insulating dollars 66 snugly received between the inner portion of the gripping sleeve 64 and the outer surfaces of the reduced diameter projecting portion 26 and 60. As will be appreciated from the drawings, the cross-sectional area of the gripping sleeve 64 is the same as the cross-sectional areas of the neck portion 22 and the cap 52 so as to form a smooth surfaced continuous handle portion 10, the opposite end of the gripping sleeve 64 of course being abutted against the corresponding shoulders 24 and 62 and locked into position by flat headed threaded fasteners 68 extending through each end portion at peripherally spaced points thereabout and engaged within threaded bores on the corresponding reduced diameter portion, either 26 or 60 as clearly detailed in FIGURE 2.

Referring specifically to the gripping sleeve 64, it is contemplated that this sleeve also be formed of cast aluminum and consist of two solid annular end portions 70 interconnected by a plurality of circumferentially spaced elongated ribs 72 integral, at opposite ends thereof, with the annular portions 70. In this manner, not only will a positive and comfortable handgrip be provided, but also any tendency for the handgrip portion to absorb heat will be substantially reduced, and in fact just about eliminated. Further, while the gripping portion of the handle portion 10 is substantially open in the light of the circumferentially spaced elongated ribs 72, it will be appreciated that the elongated coaxial pipe section 40 provides a positive shield and protective enclosure for the internally located power cable wires 36 and heating element. Incidentally, with regard to the power cord 16, the instant invention also contemplates the provision of an off-on switch 74 located at any convenient place therealong, or, if desired, directly on the plug itself as shown in FIGURE 1.

Figure 3:
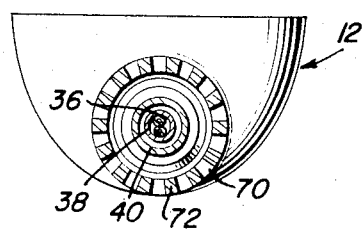
FIGURE 3 is a transverse cross-sectional view taken substantially on a plane passing along line 3—3 of FIGURE 2.
Figure 4:
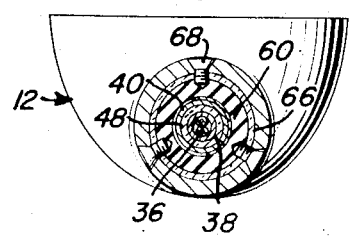
FIGURE 4 is a transverse cross-sectional view taken substantially on a plane passing along line 4—4 of FIGURE 2.

From the foregoing, it will be appreciated that a highly novel ice cream dipper has been defined, this dipper, in addition to the compact and streamline shape thereof, incorporating heating means whereby the scooping bowl itself can be heated so as to facilitate the cutting or removing of a scoop of ice cream from an enlarged container and the subsequent dispensing of this scoop of ice cream easily and efficiently without necessitating any mechanical means. Further, it has been pointed out that the dipper of the instant invention so incorporates the heating means as to eliminate any transfer of the heat to the hand of the user, while at the same time providing a unique gripping portion allowing the device to be comfortably manipulated. Incidentally, with regard to the gripping portion or sleeve, it should be noted, referring to for example FIGURES 3 and 5, that the ribs have smooth outer surfaces thus affording a comfortable grip in addition to a secure grip and a means for positively avoiding any tendency for the gripping portion to absorb heat.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed

What is claimed as new is as follows:

1. An ice cream dipper comprising a bowl portion and an elongated handle portion, said bowl portion including a semi-spherical bowl therein and a projecting neck, said handle portion including an elongated hollow gripping sleeve, a portion of said neck being received within one end of the gripping sleeve, a non-conductive cap closing the other end of said sleeve, a blind bore in said neck coaxial with said sleeve, an elongated tubular housing, said housing having a cross-sectional area substantially less than that of the sleeve, a heating element on one end of the tubular housing, said heating element being received within said bore with the housing projecting therefrom coaxial with the sleeve, said cap having a centrally located passage therethrough, the second end of the housing being received within the inner end of said passage, an elongated power cord extending from engagement with the heating element through the tubular housing and cap passage, the outer end of the blind bore in the neck and the inner end of the cap being provided with internally threaded countersunk portions, and an elongated hollow pipe section having externally threaded ends received within said countersunk portions, said pipe section surrounding said tubular housing and being surrounded by the gripping sleeve, and being in spaced relation to both.

2. The device of claim 1 wherein said gripping sleeve includes two annular end portions interconnected by a plurality of elongated ribs extending therebetween and circumferentially spaced from each other.

3. The device of claim 2 wherein said neck, sleeve and cap have substantially the same cross-sectional area.

4. The device of claim 1 wherein the portion of said neck received within one end of the sleeve is diametrically reduced and defines a substantially cylindrical portion, said neck, sleeve and cap having substantially the same cross-sectional area.

5. An ice cream dipper comprising a bowl portion and an elongated handle portion, said bowl portion including a semi-spherical bowl therein and a projecting neck, said handle portion including an elongated hollow gripping sleeve, a portion of said neck being received within one end of the gripping sleeve, a cap closing the other end of said sleeve, a bore in said neck coaxial with said sleeve, an elongated tubular housing, said housing having a cross-sectional area substantially less than that of the sleeve, a heating element on one end of the tubular housing, said heating element being received within said bore with the housing projecting therefrom coaxial with the sleeve, said cap having a centrally located passage therethrough, the second end of the housing being received within the inner end of said passage, an elongated power cord extending from engagement with the heating element through the tubular housing and cap passage, and an elongated pipe section secured to the neck and inner end of the cap, said pipe section surrounding said tubular housing and being surrounded by the gripping sleeve, and being in spaced relation to both.

6. An ice cream dipper comprising a bowl portion and an elongated handle portion, said bowl portion defining a semi-spherical bowl and having a projecting neck, said handle portion including an elongated hollow gripping sleeve fixed at one end to said projecting neck, a heating element mounted within said neck in heat transferring relation to said bowl portion, an elongated power cord engaged with said heating element and extending therefrom through said sleeve, a hollow tubular member coaxial with said sleeve and surrounding said power cord in inwardly spaced relation to said sleeve, said sleeve comprising a pair of annular end portions interconnected solely by a plurality of elongated ribs extending between said end portions and circumferentially spaced from each other so as to define a series of elongated slots opening completely through said sleeve.

7. The device of claim 6 including a closure cap fixed to the second end of the sleeve, said neck, sleeve, and cap having substantially the same cross-sectional shape and area along the length of said dipper.

References Cited by the Examiner
UNITED STATES PATENTS

| | | | |
|---|---|---|---|
| 1,732,502 | 10/1929 | Cox | 107—48 |
| 1,971,577 | 8/1934 | Parker | 107—48 |
| 2,114,703 | 4/1938 | Connor | 107—48 X |
| 2,256,770 | 9/1941 | Armstrong | 107—48 X |
| 2,260,689 | 10/1941 | Miller | 107—48 |
| 2,715,175 | 8/1955 | Jacobson | 107—48 |
| 2,782,454 | 2/1957 | Baer | 107—48 X |

WILLIAM I. PRICE, *Primary Examiner.*